(12) United States Patent
Johnson et al.

(10) Patent No.: US 8,365,533 B2
(45) Date of Patent: Feb. 5, 2013

(54) UNIVERSAL MULTI-NOZZLE COMBUSTION SYSTEM AND METHOD

(75) Inventors: Thomas Edward Johnson, Greer, SC (US); Christopher Mordaunt, Mifflinburg, PA (US)

(73) Assignee: General Electric Company, Schenectady, NY (US)

( * ) Notice: Subject to any disclaimer, the term of this patent is extended or adjusted under 35 U.S.C. 154(b) by 149 days.

(21) Appl. No.: 12/564,293

(22) Filed: Sep. 22, 2009

(65) Prior Publication Data

US 2011/0067404 A1    Mar. 24, 2011

(51) Int. Cl.
*F02C 1/00* (2006.01)

(52) U.S. Cl. ............................................ 60/739; 60/800

(58) Field of Classification Search .................. 60/39.37, 60/734, 737, 739, 740, 742, 746, 748, 796–800
See application file for complete search history.

(56) References Cited

U.S. PATENT DOCUMENTS

| | | | |
|---|---|---|---|
| 5,274,991 A | 1/1994 | Fitts | |
| 5,289,685 A * | 3/1994 | Hoffa | 60/739 |
| 5,303,542 A * | 4/1994 | Hoffa | 60/773 |
| 5,323,604 A * | 6/1994 | Ekstedt et al. | 60/804 |
| 5,630,319 A * | 5/1997 | Schilling et al. | 60/747 |
| 5,682,747 A * | 11/1997 | Brown et al. | 60/746 |
| 5,901,548 A * | 5/1999 | Coffinberry | 60/776 |
| 6,112,971 A | 9/2000 | Castaldo et al. | |
| 6,415,594 B1 * | 7/2002 | Durbin et al. | 60/772 |
| 6,453,660 B1 * | 9/2002 | Johnson et al. | 60/39.821 |
| 6,758,045 B2 * | 7/2004 | Dimov et al. | 60/804 |
| 6,983,605 B1 * | 1/2006 | Hook et al. | 60/775 |
| 7,181,916 B2 | 2/2007 | Ziminsky et al. | |
| 7,827,797 B2 * | 11/2010 | Han et al. | 60/746 |
| 8,205,452 B2 * | 6/2012 | Boardman et al. | 60/737 |
| 2010/0064691 A1 * | 3/2010 | Laster et al. | 60/737 |

* cited by examiner

*Primary Examiner* — Phutthiwat Wongwian
(74) *Attorney, Agent, or Firm* — Nixon & Vanderhye P.C.

(57) ABSTRACT

A gas turbine combustion system includes a supporting fuel manifold including a plurality of fuel nozzle support openings and a plurality of fuel line passages, and an aft case defining at least part of a combustion zone. The supporting fuel manifold is connected to the aft case. A plurality of fuel nozzles are supported one each in the plurality of fuel nozzle support openings, and a plurality of fuel lines communicate with the plurality of fuel line passages. The plurality of fuel lines deliver fuel to the plurality of fuel nozzles via the plurality of fuel line passages.

12 Claims, 6 Drawing Sheets

FIG. 6

UNIVERSAL MULTI-NOZZLE COMBUSTION SYSTEM AND METHOD

BACKGROUND OF THE INVENTION

The invention relates to a universal multi-nozzle combustion system and, more particularly, to a gas turbine combustion system including a series of independent fuel nozzles mounted in a supporting fuel manifold.

Design of a combustion system for an advanced gas turbine requires extensive development and testing before a final product can be completed. The components developed tend to be machine specific, with few or no parts being universal to all machines. It would be desirable to utilize developed nozzle technology to create a flexible platform for multiple machines that requires a minimal amount of unique machine components.

BRIEF DESCRIPTION OF THE INVENTION

In an exemplary embodiment, a gas turbine combustion system includes a supporting fuel manifold including a plurality of fuel nozzle support openings and a plurality of fuel line passages, and an aft case defining at least part of a combustion zone. The supporting fuel manifold is connected to the aft case. A plurality of fuel nozzles are supported one each in the plurality of fuel nozzle support openings, and a plurality of fuel lines communicate with the plurality of fuel line passages. The plurality of fuel lines deliver fuel to the plurality of fuel nozzles via the plurality of fuel line passages.

In another exemplary embodiment, a gas turbine combustion system includes an end cover and an aft case connected to the end cover, which together define at least part of a combustion zone. A supporting fuel manifold is sandwiched between the end cover and the aft case. The supporting fuel manifold includes a plurality of fuel nozzle support openings and a plurality of fuel line passages. A plurality of fuel nozzles are supported one each in the plurality of fuel nozzle support openings, and a plurality of fuel lines communicate with the plurality of fuel line passages. The plurality of fuel lines deliver fuel to the plurality of fuel nozzles via the plurality of fuel line passages.

In yet another exemplary embodiment, a method of customizing a gas turbine combustion system to meet machine power output requirements includes the steps of determining a number of fuel nozzles required to meet the machine output requirements; constructing a supporting fuel manifold including a plurality of fuel nozzle support openings corresponding to the number of fuel nozzles and a plurality of fuel line passages; securing the plurality of fuel nozzles one each in the plurality of fuel nozzle support openings; connecting fuel lines to the plurality of fuel line passages to deliver fuel to the fuel nozzles; and assembling the gas turbine combustion system by connecting the supporting fuel manifold, the plurality of fuel nozzles and the plurality of fuel lines to an aft case.

DETAILED DESCRIPTION OF THE INVENTION

According to preferred embodiments, the gas turbine combustion system includes a series of small independent fuel nozzles mounted in a supporting fuel manifold. The fuel nozzles are of standard design (like the GEAE Dual Annular Counter Rotating Swirler or DACRS nozzle), and the number of nozzles can be varied for a particular machine power output. With this construction, only a unique fuel manifold needs to be designed for each particular application. The smaller fuel nozzles have excellent emissions, dynamics, fuel flexibility and performance characteristics because of their enhanced mixing capabilities. Additionally, the simplified nozzles, fuel manifold, and end cover provides dramatic cost savings over the entire fleet of machines.

Figure 1:
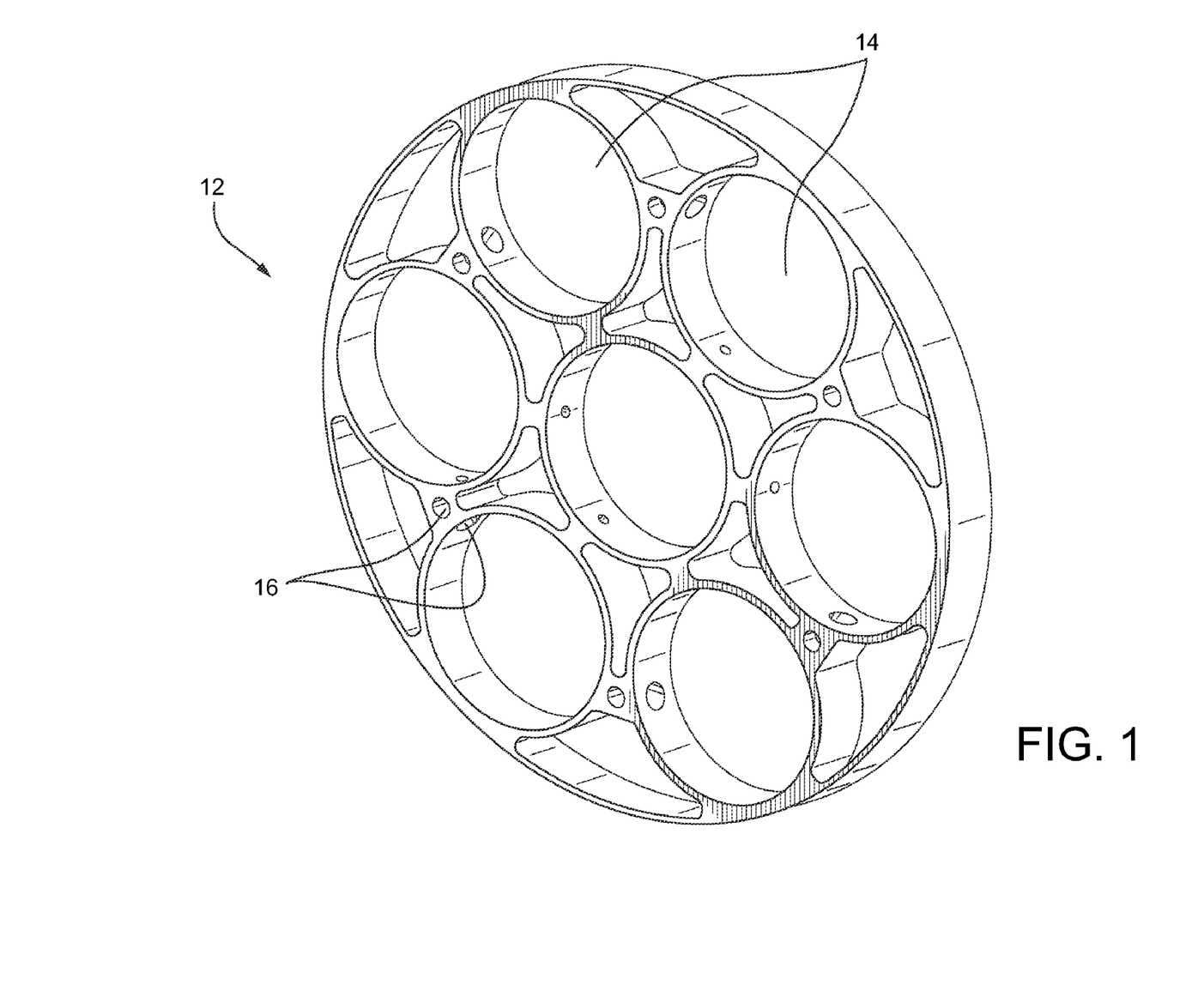
FIG. 1 is a perspective view of an exemplary fuel manifold.

FIG. 1 is a perspective view of an exemplary "wine rack" fuel manifold 12 that provides structural support for the fuel nozzles and corresponding fuel lines. The fuel manifold 12 includes a plurality of fuel nozzle support openings 14 and a plurality of fuel line passages 16. The fuel manifold 12 is specific to each machine and is designed to support an appropriate number of nozzles for a particular machine power output requirement.

Figure 2:
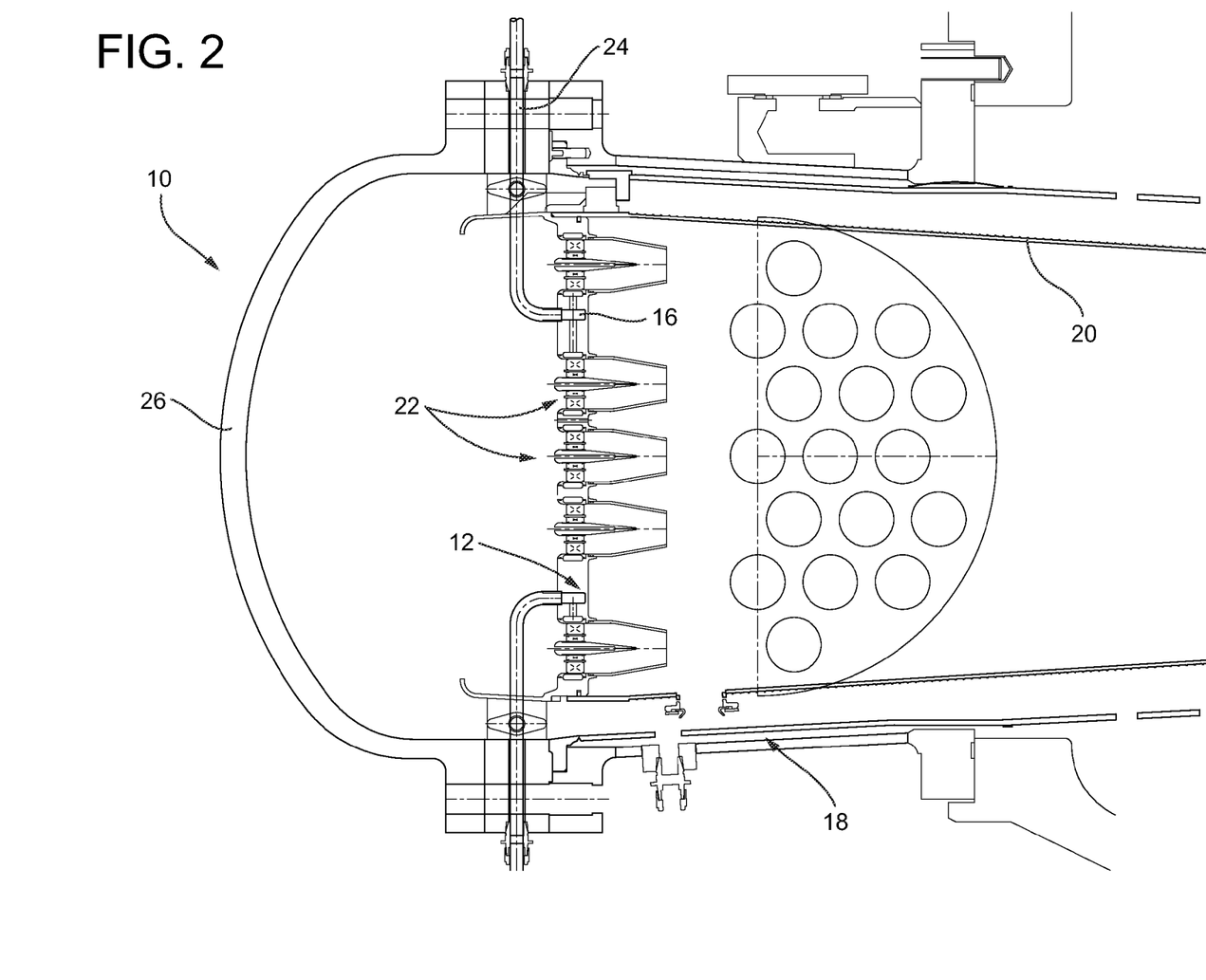
FIG. 2 is a sectional view of the overall system with fuel nozzles/injectors installed in a manifold.

FIG. 2 is a cross sectional view of a combustion nozzle system 10 utilizing the multi-nozzle combustor concept. The fuel manifold 12 is coupled with an aft case, which defines at least part of a combustion zone. A liner 20 is disposed radially inward of the aft case 18. A plurality of fuel nozzles 22 are supported in the fuel nozzle support openings 14 of the fuel manifold 12. Fuel lines 24 are provided in communication with the fuel line passages 16 of the fuel manifold 12. The fuel lines 24 deliver fuel to the fuel nozzles 22 via the fuel line passages 16.

By virtue of the smaller fuel nozzles 22, the system requires no forward case and rather utilizes a simple domed end cover 26. The domed end cover 26 is a simple hemispherical pressure vessel that requires no connections. The fuel manifold 12 is sandwiched between the domed end cover 26 and the aft case 18, and the fuel lines 24 preferably run out of the side of the fuel manifold 12 as shown in FIG. 2.

Figure 3:
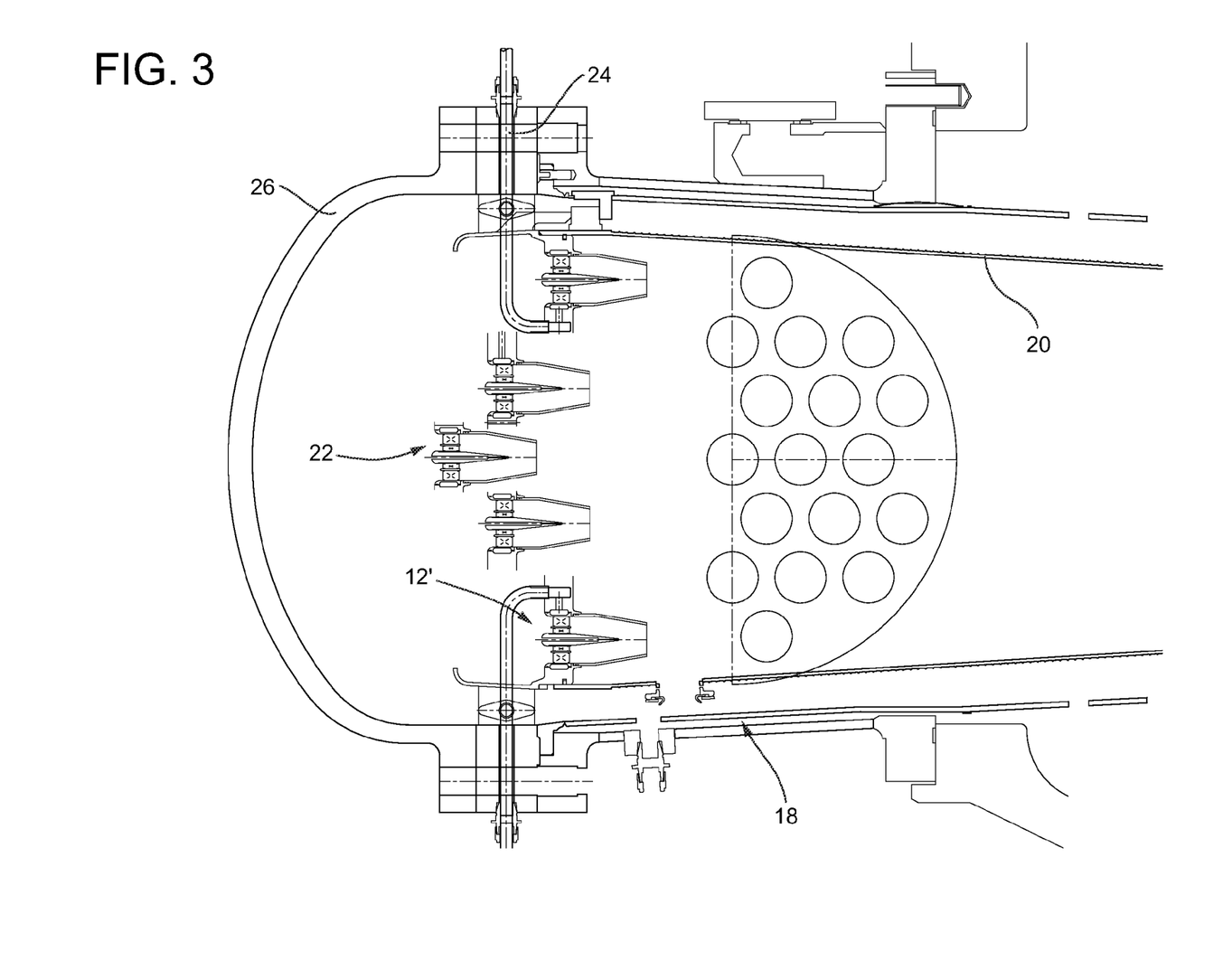
FIG. 3 is a sectional view of the system showing an alternative arrangement of the fuel injectors.

FIG. 3 shows a slightly modified construction of the fuel manifold 12' where the fuel manifold 12' is generally bowl-shaped to thereby stage relative positions of the fuel nozzles 22. That is, the curved manifold 12' allows "nesting" of the center nozzles 22. This construction improves turn down (i.e., running at low load while maintaining emissions compliance) and reduces specific dynamic frequency response of the combustion system.

Figure 4:
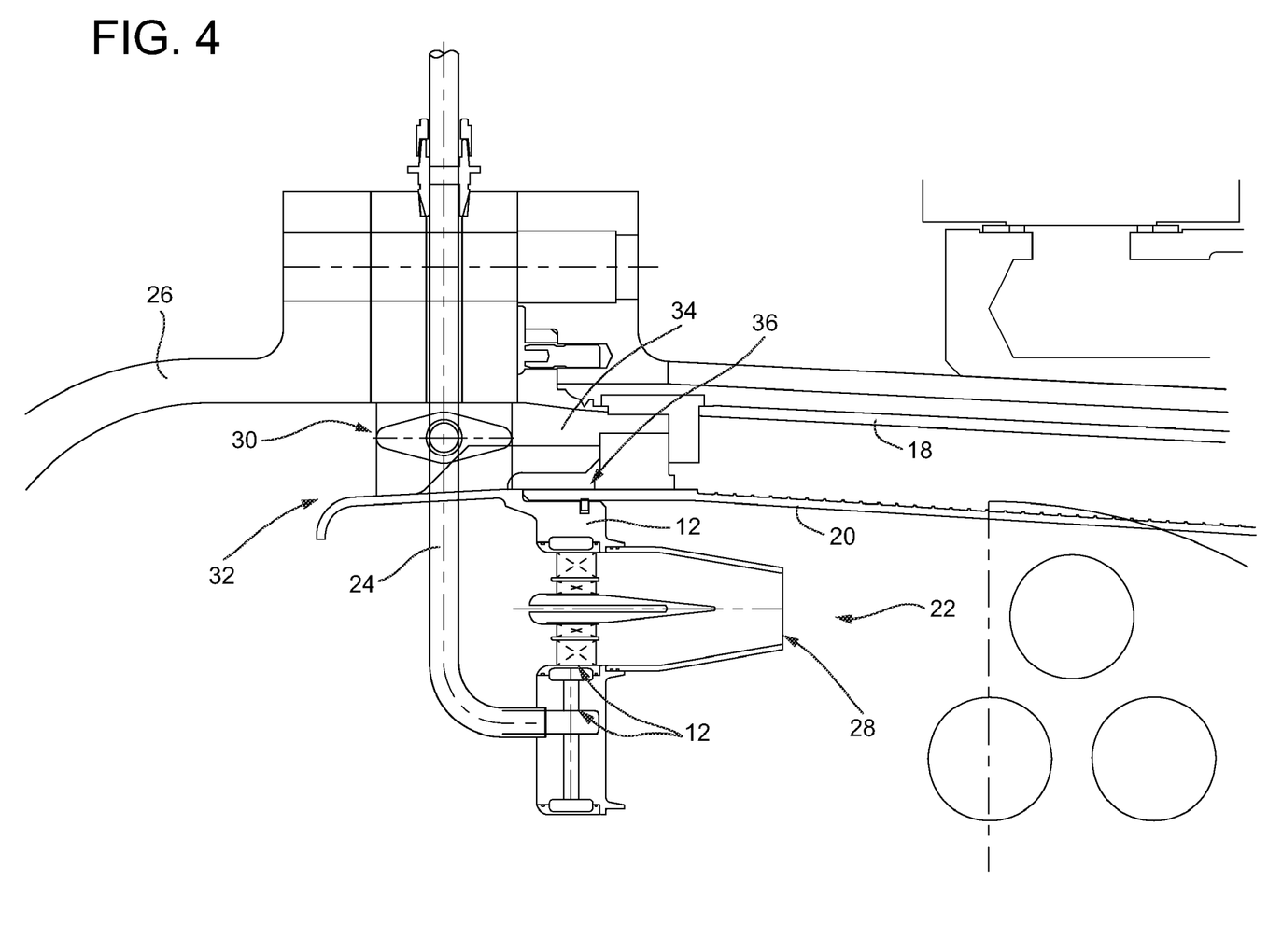
FIG. 4 is a detailed sectional view of a fuel manifold.

FIG. 4 is a detailed view of the fuel manifold 12, domed end cover 26 and manifold interface with the aft case 18. The fuel nozzle 22 shown is a DACR (Dual Annular Counter Rotating) swirler including a fuel nozzle cone 28. The fuel nozzles 22 are secured in the fuel manifold 12 in any suitable manner such as by brazing or being bolted and including a suitable seal.

The struts 30 are a plurality of narrow supports that connect the inner cylindrical frame structure to the outer frame structure while allowing air to pass through. It has an aerodynamic cross section as illustrated in FIG. 4 by a diamond like shape.

The diffuser 32 is an annulus that diffuses or slows down the air prior to dumping the air. When high velocity air is dumped into still or slower air, it has losses. If the air is slowed down, without causing a separation in the flow, prior to dumping it, it has less of a loss in energy. In FIG. 4, the inner cylindrical feature is shaped conically inward, which creates an expanding area and thus diffuses the air.

The liner stop 34 serves to stop the liner from being forced in a forward direction. The liner is a cone shape and has a higher pressure on the outside than the inside which results in a net forward force (left direction in FIG. 4). The liner has three lugs welded to it around the perimeter, and in this configuration, three finger-like tabs could be added to the cap support structure to line up the tabs on the liner. This stops the liner from moving forward while minimizing the air blockage.

The piston ring 36 is intended to minimize the leakage into the combustor. When the liner and fuel manifold are assembled, there is a small gap between the two parts. The piston ring 36 is a compliant type of seal that prevents leakage over a range of gap sizes. It is desirable for all of the air to go through the fuel nozzles and not through leaks.

Figure 5:
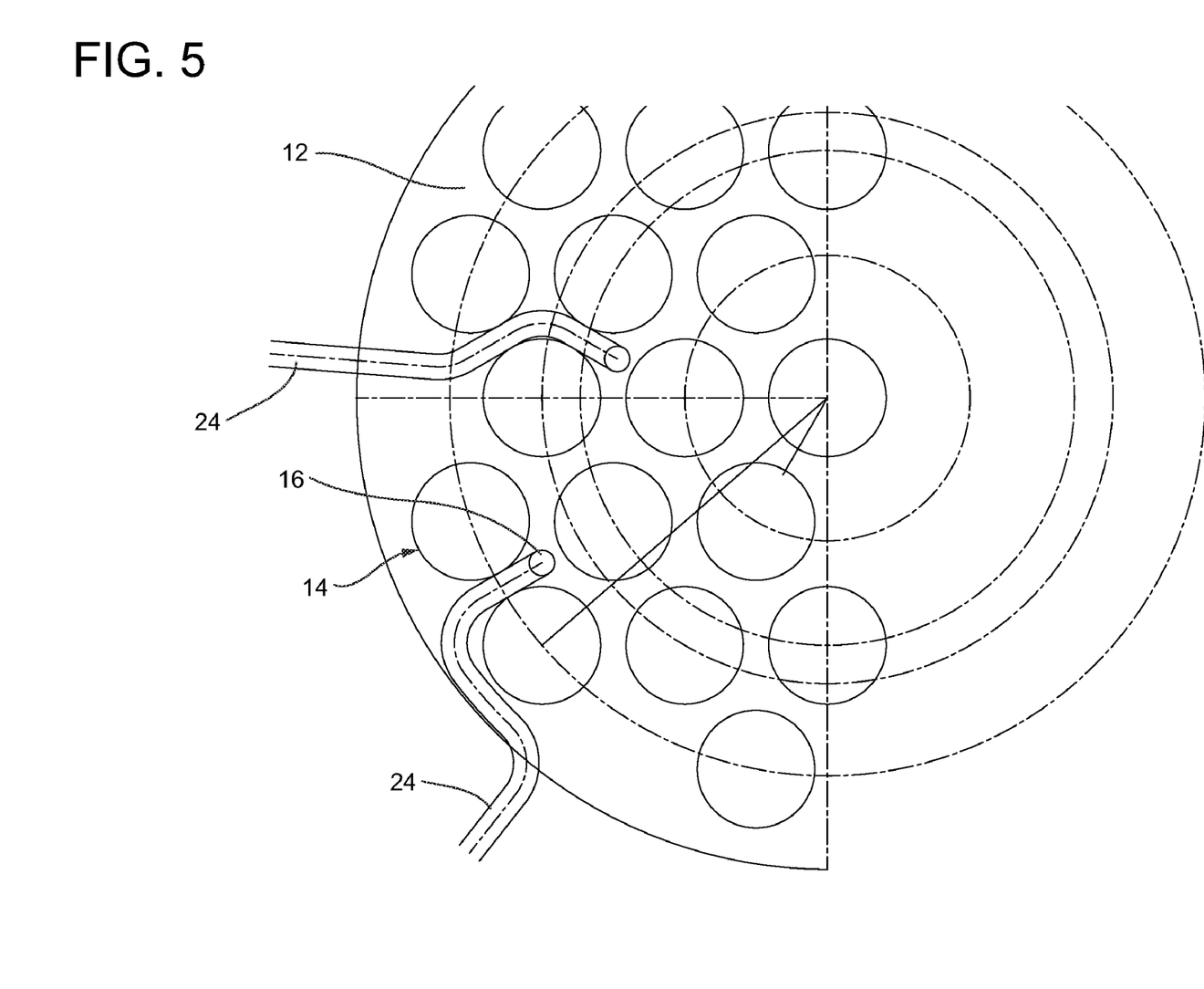
FIG. 5 illustrates a fuel line routing option.

FIG. 5 shows fuel line routing options that could provide staging of the combustor through controlling flow to individual passages of the manifold 12. A plurality of fuel lines 24 are shown, which are connected with fuel line passages 16 in the manifold 12.

Figure 6:
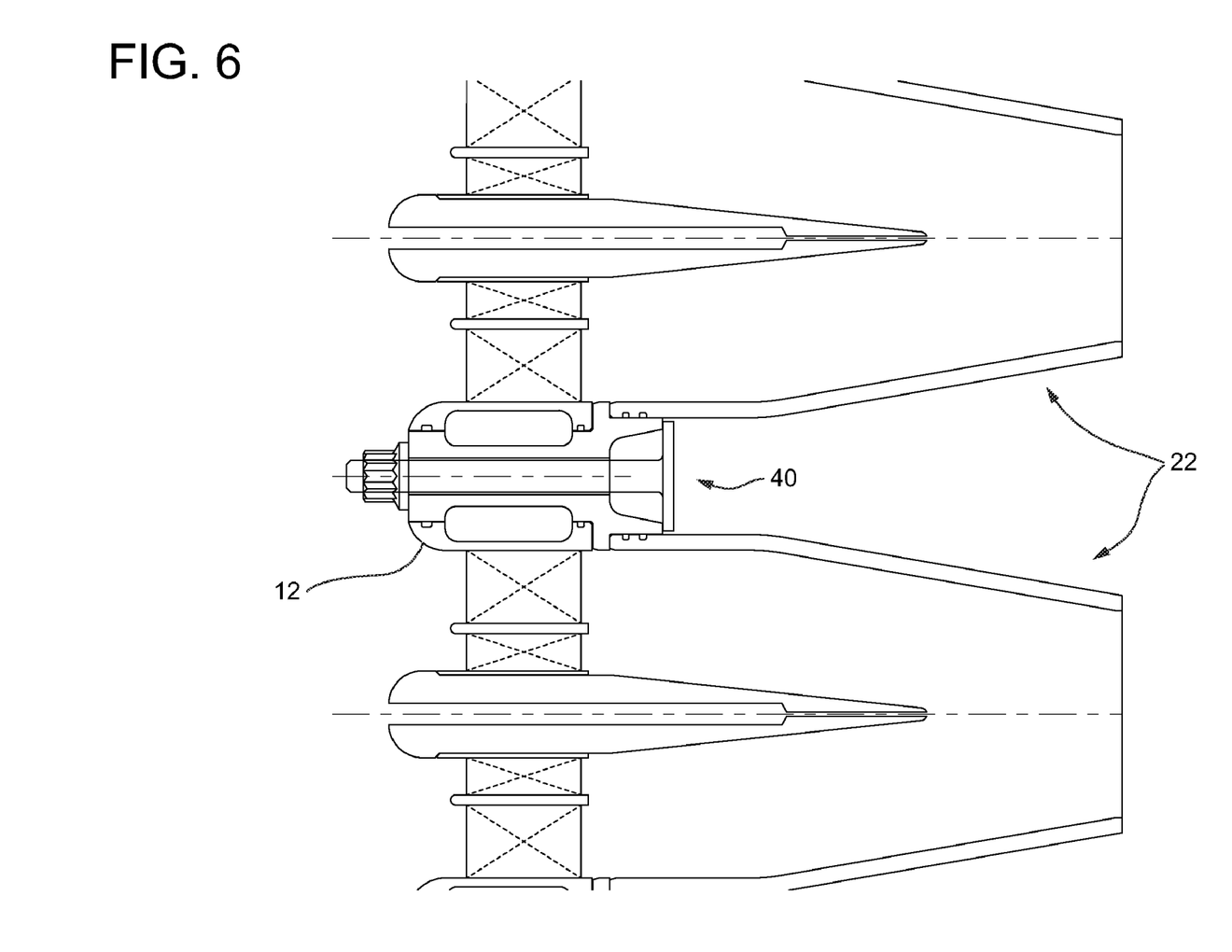
FIG. 6 is a sectional view showing an impingement cooling option.

FIG. 6 is a sectional view showing an impingement cooling scheme for the fuel manifold 12. In operation, heat on the braze joints or the like securing the fuel nozzles 22 in the manifold 12 could cause thermal gradients, which may detrimentally affect operation of the combustion system. FIG. 6 shows a floating heat shield 40 secured to the manifold 12 between two of the fuel nozzles 22. The heat shield 40 protects the braze joints from heat during operation of the system.

The system results in a low cost means of creating multiple families of gas turbine combustion systems that utilize a minimal number of unique components. Machines equipped with this combustion system would share fuel nozzle technology, therefore eliminating the need for individual nozzles specific to each machine. The smaller fuel nozzles have excellent emissions, dynamics, fuel flexibility, and performance characteristics because of their enhanced mixing capabilities. Additionally, the simplified nozzles, fuel manifold, and end cover provide dramatic cost savings over the entire fleet of machines. Still further, since the concept can be retrofittable to existing machines, installation of the system in older machines could allow for greater operability of current machines.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A gas turbine combustion system comprising:
   a supporting fuel manifold including a plurality of fuel nozzle support openings and a plurality of fuel line passages, the plurality of fuel nozzle support openings arranged as one or more concentric arrays surrounding a center nozzle support opening, the fuel support manifold defining at least part of a combustion zone;
   an aft case defining a central longitudinal axis, the supporting fuel manifold being connected to the aft case;
   a center nozzle supported in the center nozzle support opening, the center nozzle sharing the central longitudinal axis with the aft case;
   a plurality of fuel nozzles, each of the fuel nozzles being supported in a respective one of the plurality of fuel nozzle support openings; and
   a plurality of fuel lines communicating with the plurality of fuel line passages, the plurality of fuel lines delivering fuel to the plurality of fuel nozzles via the plurality of fuel line passages.

2. A gas turbine combustion system according to claim 1, wherein a number of the plurality of fuel nozzles is variable depending on machine power output requirements.

3. A gas turbine combustion system according to claim 2, wherein the supporting fuel manifold comprises a number of fuel nozzle support openings corresponding to the number of fuel nozzles.

4. A gas turbine combustion system according to claim 1, further comprising an end cover on an upstream side of the supporting fuel manifold, the supporting fuel manifold being sandwiched between the end cover and the aft case.

5. A gas turbine combustion system according to claim 1, wherein the supporting fuel manifold is bowl shaped, and wherein at least some of the plurality of fuel nozzles are axially staged relative to others of the plurality of fuel nozzles, the fuel nozzles having outlet ends occupying different axial planes.

6. A gas turbine combustion system according to claim 1, wherein the plurality of fuel lines run out of a side of the supporting fuel manifold.

7. A gas turbine combustion system according to claim 1, wherein the plurality of fuel lines are routed to effect staging of the combustion system by controlling fuel flow in the plurality of fuel lines.

8. A gas turbine combustion system according to claim 1, further comprising at least one heat shield secured to the supporting fuel manifold between the plurality of fuel nozzles, the at least one heat shield being oriented in a transverse direction to a longitudinal axis of the fuel nozzles.

9. A gas turbine combustion system comprising:
   an end cover, the end cover being a hemispherical pressure vessel;
   an aft case connected to the end cover, the aft case defining a central longitudinal axis through a combustion zone;
   a supporting fuel manifold sandwiched between the end cover and the aft case and defining at least part of the combustion zone, the supporting fuel manifold including a center nozzle support opening, a plurality of fuel nozzle support openings and a plurality of fuel line passages, the plurality of fuel nozzle support openings arranged as one or more concentric arrays surrounding the center nozzle support opening;
   a center nozzle supported in the center nozzle support opening, the center nozzle sharing the central longitudinal axis with the aft case;
   a plurality of fuel nozzles, each of the fuel nozzles being supported in a respective one of the plurality of fuel nozzle support openings; and
   a plurality of fuel lines communicating with the plurality of fuel line passages, the plurality of fuel lines delivering fuel to the plurality of fuel nozzles via the plurality of fuel line passages.

10. A gas turbine combustion system according to claim 9, wherein a number of the plurality of fuel nozzles is variable depending on machine power output requirements.

11. A gas turbine combustion system according to claim 9, wherein the supporting fuel manifold is bowl shaped, and wherein at least some of the plurality of fuel nozzles are axially staged relative to others of the plurality of fuel nozzles, the fuel nozzles having outlet ends occupying different axial planes.

12. A gas turbine combustion system comprising:
- a supporting fuel manifold including a plurality of fuel nozzle support openings and a plurality of fuel line passages, the supporting fuel manifold defining at least part of a combustion zone;
- an aft case being connected to the supporting fuel manifold;
- a plurality of fuel nozzles, each of the fuel nozzles being supported in a respective one of the plurality of fuel nozzle support openings; and
- a plurality of fuel lines communicating with the plurality of fuel line passages, the plurality of fuel lines delivering fuel to the plurality of fuel nozzles via the plurality of fuel line passages, wherein the supporting fuel manifold is bowl shaped, and wherein at least some of the plurality of fuel nozzles are axially staged relative to others of the plurality of fuel nozzles, having outlet ends occupying different axial planes.

* * * * *

UNITED STATES PATENT AND TRADEMARK OFFICE
CERTIFICATE OF CORRECTION

PATENT NO. : 8,365,533 B2
APPLICATION NO. : 12/564293
DATED : February 5, 2013
INVENTOR(S) : Johnson et al.

It is certified that error appears in the above-identified patent and that said Letters Patent is hereby corrected as shown below:

In Claim 12, column 6, lines 9-10, insert --the fuel nozzles-- before "having outlet ends occupying different axial planes"

Signed and Sealed this
Second Day of April, 2013

Teresa Stanek Rea
*Acting Director of the United States Patent and Trademark Office*